(12) United States Patent
Burges et al.

(10) Patent No.: US 7,788,696 B2
(45) Date of Patent: Aug. 31, 2010

(54) INFERRING INFORMATION ABOUT MEDIA STREAM OBJECTS

(75) Inventors: Christopher J. C. Burges, Bellevue, WA (US); Cormac E. Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 2054 days.

(21) Appl. No.: 10/686,240

(22) Filed: Oct. 15, 2003

(65) Prior Publication Data

US 2005/0086682 A1  Apr. 21, 2005

(51) Int. Cl.
*H04N 7/173* (2006.01)
*G06F 3/00* (2006.01)

(52) U.S. Cl. .......................... 725/114; 725/87; 715/722
(58) Field of Classification Search ................ 725/114; 715/715, 716, 719, 722
See application file for complete search history.

(56) References Cited

U.S. PATENT DOCUMENTS

| | | | | |
|---|---|---|---|---|
| 5,504,518 | A * | 4/1996 | Ellis et al. ....................... 725/22 |
| 5,737,734 | A * | 4/1998 | Schultz ........................... 707/5 |
| 5,818,510 | A * | 10/1998 | Cobbley et al. ............. 725/139 |
| 6,014,665 | A * | 1/2000 | Culliss ........................... 707/5 |
| 6,263,507 | B1 * | 7/2001 | Ahmad et al. ................ 725/134 |
| 6,400,378 | B1 * | 6/2002 | Snook ........................... 715/716 |
| 6,434,520 | B1 * | 8/2002 | Kanevsky et al. ........... 704/243 |
| 6,469,749 | B1 | 10/2002 | Dimitrova et al. |
| 6,564,263 | B1 | 5/2003 | Bergman et al. |
| 6,675,174 | B1 * | 1/2004 | Bolle et al. ............... 707/104.1 |
| 6,774,917 | B1 * | 8/2004 | Foote et al. .................. 715/700 |
| 6,961,954 | B1 * | 11/2005 | Maybury et al. .............. 725/53 |
| 7,080,392 | B1 * | 7/2006 | Geshwind ..................... 725/34 |
| 2003/0101144 | A1 | 5/2003 | Moreno |

FOREIGN PATENT DOCUMENTS

WO  WO0239730  5/2002
WO  WO03021954  3/2003

OTHER PUBLICATIONS

Jinwoun Choi et al: "Story board construction using sefmntation of MPEG encoded news video" Circuits and Systems, 2000. Proceedings of the 43rd IEEE Midwest sumposiumon Aug. 8-11, 2000, pafes 758-761, XP010558616 ISBN: 0-7803-6475-9.
Chaisorn L et al: "The segmentation of news video into story units" Multimedia and Expo, 2002. ICME '02. Proceedings. 2002 IEEE International Conference on Lausanne, Switzerland Aug. 26-29, 2002, Piscataway, NJ, USA, IEEE, Us, 73-76, XP010604309 ISBN: 0-7803-7304-9.

\* cited by examiner

*Primary Examiner*—Andrew Y Koenig
*Assistant Examiner*—Jason Thomas
(74) *Attorney, Agent, or Firm*—Lee & Hayes, PLLC

(57) ABSTRACT

Information about media objects within media streams is inferred based on repeat instances of the media objects within the media streams. A system and methods enable the monitoring of one or more media streams and the identification of repeat instances of media objects (e.g., audio and/or video objects) within the media streams. The monitoring and object repeat identification is performed by one or more server computers on a network. Information about a media object can be inferred based on repeat instances of the media object and based on repeat instances of related media objects. The information is transferred from a server to a client in response to a user query entered at the client through an interactive user interface.

16 Claims, 5 Drawing Sheets

INFERRING INFORMATION ABOUT MEDIA STREAM OBJECTS

TECHNICAL FIELD

The present disclosure generally relates to inferring information about media objects in media streams, and more particularly, to inferring information about media objects from repeating instances of audio and/or video objects identified within one or more media streams.

RELATED APPLICATIONS

This patent application is related to U.S. patent application Ser. No. 10/428,812, which was filed on May 2, 2003, titled "A System And Method For Providing User Control Over Repeating Objects Embedded In A Stream", and is hereby incorporated by reference.

BACKGROUND

Media outlets, such as broadcast television and radio stations affiliated with, for example, NBC, ABC, CBS, FOX, CNN, ESPN, and so on, generally deliver media in the form of media streams. Such media streams link together numerous media objects having a variety of different lengths and conveying information on a variety of different topics. For example, a CNN station (radio or television) might have a 30 minute program (i.e., media stream) that includes various news clips, followed by various advertisement clips, followed by various weather-related news clips, followed again by various advertisement clips, followed by various sports-related news clips, and so on. Similarly formatted media streams might repeat on a CNN station every 30 minutes.

The information available in such media streams from different media outlets is generally comprehensive. That is, given enough time, particular media objects within media streams, such as songs or certain news clips, will likely begin to repeat within the media streams. For example, an important news story on a CNN station may begin as a breaking news clip. The breaking story might then be repeated in various forms throughout the day during each 30 minute news segment broadcast on the CNN station. Thus, when an important news story initially emerges, the breaking news clip covering the story might initially play in its entirety while subsequent coverage of the same story may only include repeated, but smaller versions of the original breaking news clip.

Various other scenarios can be described in which media objects in media streams exhibit repeat patterns within the media streams. For example, some news stories start out being of minor importance, but then continue to grow into very important stories. Thus, initial coverage of such a story might include a short news clip, while subsequent coverage may include longer and more in-depth news clips containing additional information about various aspects of the story. As the story begins to lose importance, the length and breadth of the news clips covering the story diminish again. However, throughout the coverage of the story, it is likely that the various news clips contain repeated portions of prior news clips. Such repeated portions can be recognized as repeating media objects within a media stream, as is generally described in the related application, "A System And Method For Providing User Control Over Repeating Objects Embedded In A Stream", as noted above.

In another similar example, a music media outlet (e.g., a radio station) may broadcast a debut song from a new artist on a relatively infrequent basis. However, the song may quickly become a popular hit, and the media outlet might dramatically increase the frequency with which it broadcasts the new song. As the popularity of the new song wears off, the frequency with which it is broadcast would also decrease. Again, the repeating song within the media outlet's media stream can be recognized as a repeating media object.

In addition to being comprehensive, however, the information available in media streams from various media outlets is diffuse. As mentioned above, the types of information in such media streams can cover a wide variety of different topics. The wide variety of information available in a media stream presents a problem when trying to find a particular media object within the stream. Furthermore, trying to discover additional information about a particular media object within a media stream presents an even greater challenge. Current methods for identifying media objects within a media stream include creating a database of known objects that can be compared (e.g., using audio fingerprinting) against sampled portions of the media stream. However, unless a database of known objects is created or already available for comparison, such methods are not possible. The alternative is to locate a desired media object from within a media stream by "manually" sifting through a vast amount of data, which is impractical.

The related application, "A System And Method For Providing User Control Over Repeating Objects Embedded In A Stream", mentioned above, includes a discussion of identifying and extracting or segmenting repeating media objects from a media stream. A need exists, however, for a way to infer information about such media streams in general, and about the media objects within such media streams more specifically.

SUMMARY

Inferring information about media objects in media streams is described herein.

In accordance with one implementation, repeat instances of media objects are identified within a media stream. Information about the media objects is then inferred based on the repeat instances of the media objects within the media stream.

In accordance with another implementation, repeat instances of media objects are identified within a plurality of media streams. Information about the media objects is then inferred based on the repeat instances of the media objects within a plurality of the media streams.

In accordance with another implementation, a request for information regarding a media object is received. The information is inferred from repeat instances of media objects occurring within one or more media streams. The information is then returned.

In accordance with another implementation; a server is configured to monitor a media stream and to identify and record repeat instances of media objects within the media stream. The server is further configured to respond to requests for information regarding media objects by inferring information from the repeat instances.

In accordance with another implementation, a server is configured to monitor a plurality of media streams and to identify and record repeat instances of media objects within the media streams. The server is further configured to respond to requests for information regarding media objects by inferring information from the repeat instances.

BRIEF DESCRIPTION OF THE DRAWINGS

The same reference numerals are used throughout the drawings to reference like components and features.

DETAILED DESCRIPTION

Overview

The following discussion is directed to inferring information about media objects within media streams and to enabling a user to access that information. Systems and methods that enable the monitoring of one or more media streams and the identification of repeat instances of media objects (e.g., audio and/or video objects) within the media streams are described. The monitoring and object repeat identification is performed by one or more server computers on a network. Information about a media object can be inferred based on repeat instances of the media object, repeat instances of related media objects, and on metadata commonly associated with such objects, such as closed captioning. The information is transferred from a server to a client in response to a user query entered at the client through an interactive user interface.

The system and methods are generally described in terms of a media service that provides access to media streams from various media outlets and enables a user to quickly access relevant additional media related to media currently being experienced. For example, a user watching a news clip can request different (e.g., longer) versions of the news clip or additional news clips that are related to the current news clip. The system and methods also enable a user to request and access media objects of higher relative significance from one or more media streams. For example, a user can request the top 3 news stories that occurred during a given day on one or a number of different media streams.

Exemplary Environment

Figure 1:
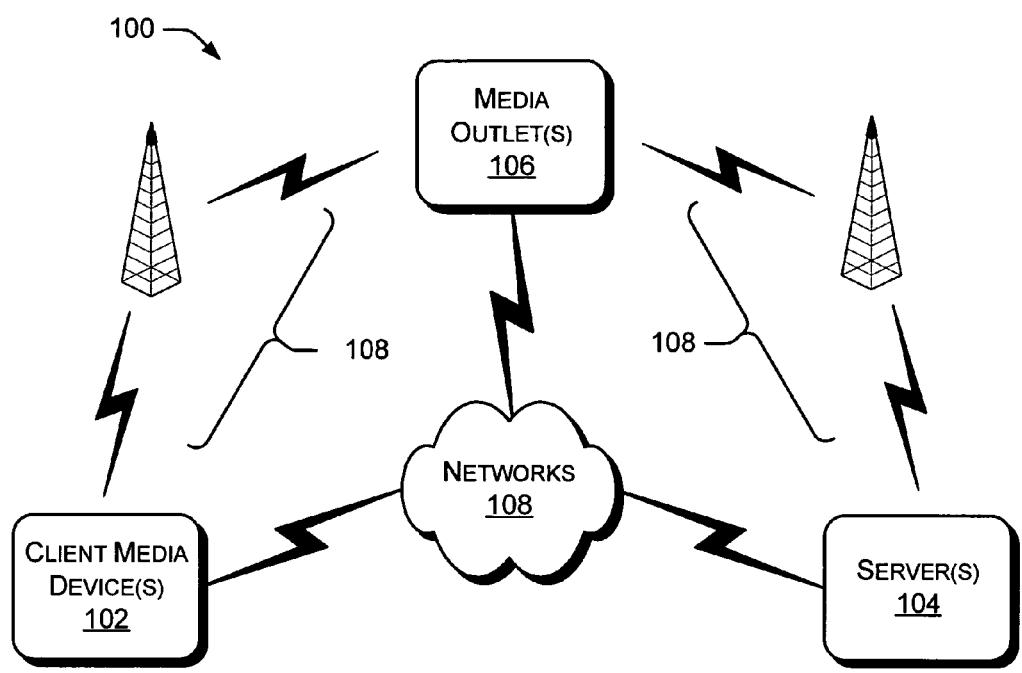
FIG. 1 illustrates an exemplary environment suitable for inferring information about media objects from media streams.

FIG. 1 illustrates an exemplary environment 100 that is suitable for inferring information about media objects within media streams. The exemplary environment 100 can include client media device(s) 102 of various types, server(s) 104, and media outlet(s) 106. A client media device 102 is operatively coupled at various times to server(s) 104 and media outlet(s) 106 through networks 108. Networks 108 can include both local and remote connections depending on the particular system configuration. Thus, networks 108 may include, for example, any one or a combination of a modem, a cable modem, a LAN (local area network), a WAN (wide area network), an intranet, the Internet, or any other suitable communication link.

Networks 108 may also include various other components useful for delivering media streams from various digital and/or analog television and radio signal broadcasts provided by media outlets 106. Accordingly, networks 108 may include, for example, antennas to transmit radio waves within a regionalized area where client media devices 102 and servers 104 may operate to receive the broadcasts, satellites orbiting the earth for transmitting broadcast signals to client media devices 102 and servers 104, or cable TV providers that bring signals directly to client media devices 102 and servers 104 via a cable. Such media delivery systems are generally well-known to those skilled in the art and will therefore not be described in further detail.

Client media device(s) 102 generally receive and render media streams from various digital and/or analog television and radio signal broadcasts provided by media outlets 106. In addition, as discussed more fully herein below, client media devices 102 communicate with server(s) 104 in a manner which provides users with additional information and control regarding the media streams from media outlets 106. A client media device 102 is otherwise typically capable of performing common computing functions, such as email, calendaring, task organization, word processing, Web browsing, and so on. A client media device 102 may run an open platform operating system, such as the Windows® brand operating systems from Microsoft®. A client media device 102 may be implemented, for example, as a desktop computer, a server computer, a television set-top box, a laptop computer, or other form of personal computer (PC). A client media device 102 may also be implemented as a hand-held computer device such as, for example, a cell phone or a PDA (personal digital assistant; e.g., devices running Microsoft®'s PocketPC, Hewlett-Packard's Palmtop, 3Com's PalmPilot, etc.). Such hand-held devices generally provide some version of an operating system such as Windows CE, and more limited computing capabilities than a typical personal computer. Thus, such hand-held devices typically provide limited versions of applications for emailers, phone, SMS (short message service), organizers, Web browsers and so on. One exemplary implementation of a client media device 102 is described in more detail below with reference to FIG. 5.

A server 104 is typically implemented as one or more server computers such as a Web server. Thus, a server 104 may include a variety of general purpose computing devices such as a workstation computer, and may be configured in a manner similar to an exemplary implementation of client media device 102, such as that described below with reference to FIG. 5. Server 104 generally provides storage for electronic documents and information including various multi-media content that is accessible to client computers such as client media device 102 over network 108. More specifically, and as discussed in greater detail herein below, server 104 offers an online service that provides extra information to users of client media devices 102. The extra information is related to media streams and media objects within media streams received from media outlets 106.

Media outlets 106 generally include programming sources that develop media streams for transmission through their affiliated providers to client media devices 102 and servers 104. Thus, the media outlets 106 of FIG. 1 generally represent both programming sources and their affiliated providers. Programming sources may include radio and TV media outlets such as NBC, ABC, CNN, ESPN, HBO, and so on. Affiliated providers of these sources may include, for example, direct broadcast satellite (DBS) providers, local cable TV providers, and local radio stations.

In general, a multimedia architecture and related components facilitating the inference and access of information about media objects repeating within media streams are described throughout this disclosure. Such components are discussed in the general context of computer/processor-executable instructions, such as program modules being executed by a personal computer. Program modules generally include routines, programs, objects, components, data structures, etc., that perform particular tasks or implement particular abstract data types. Those skilled in the art will appreciate that such program modules may be implemented using various computer system configurations, including those mentioned above. Furthermore, such program modules may also be practiced in distributed computing environments where tasks are performed by remote processing devices that are linked through a communications network such as network 108. In a distributed computing environment, program modules may be located in both local and remote memory storage devices.

Identifying and Segmenting Repeating Objects from a Media Stream

The identification and segmentation of repeating objects from a media stream is discussed in general terms herein below. However, a more detailed description can be found in the related U.S. patent application Ser. No. 10/428,812, which was filed on May 2, 2003, titled "A System And Method For Providing User Control Over Repeating Objects Embedded In A Stream", and which is incorporated herein by reference.

Many media streams contain media "objects" that repeat. Repeating media objects in a media stream include any section of the stream that has a non-negligible duration, such as a news clip, song, video, advertisement, jingle, and so on. For example, an audio stream derived from a typical pop radio station will contain, over time, many repetitions of the same objects, including, for example, news clips, songs, jingles, advertisements, and station identifiers. Similarly, an audio/video media stream derived from a typical television station will contain, over time, many repetitions of the same objects, including, for example, commercials, advertisements, news clips, station identifiers, program "signature tunes", or emergency broadcast signals. However, these objects will typically occur at unpredictable times within the media stream, and they are frequently corrupted by noise caused by the acquisition process used to capture or record the media stream.

For example, media objects in a typical media stream, such as a radio broadcast, are often corrupted by voice-overs at the beginning and/or end point of each object. Further, such objects are frequently foreshortened, i.e., they are not played completely from the beginning or all the way to the end. This is particularly true for news-related media objects that may begin as objects conveying a full-length news story, and then over time be diminished in length as the news story becomes less important. Other media objects may be intentionally distorted for other reasons. For example, audio broadcast via a radio station is often processed using compressors, equalizers, or any of a number of other time/frequency effects. In addition, audio objects, such as music or a song, broadcast on a typical radio station are often cross-faded with the preceding and following music or songs, thereby obscuring the audio object start and end points, and adding distortion or noise to the object. Such manipulation of the media stream is well known to those skilled in the art. These manipulations can occur either individually or in combination, and are generally referred to herein as "noise", except where they are explicitly referred to individually. Identification of such objects and locating the endpoints for such objects in such a noisy environment is a challenging problem.

Figure 2:
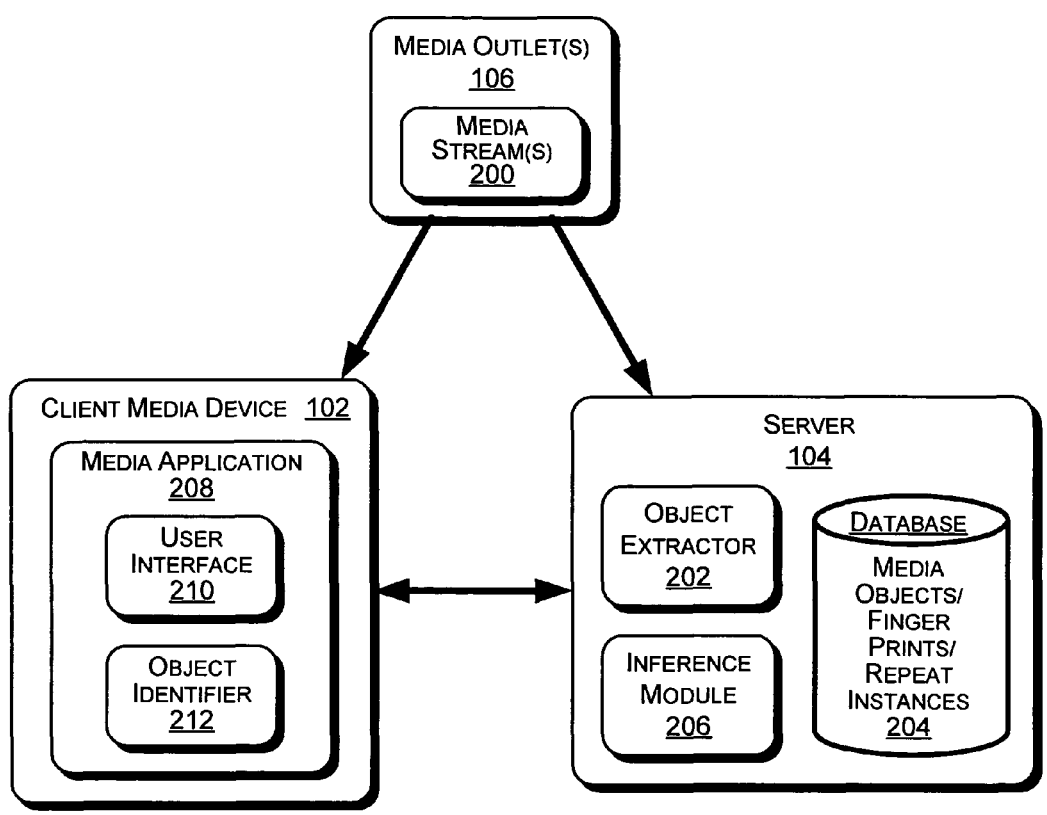
FIG. 2 illustrates an exemplary embodiment of a computer and server that are suitable for inferring information about media objects within media streams provided by a media outlet.

FIG. 2 illustrates an exemplary embodiment of a computer 102 and server 104 that are suitable for inferring information about media objects within media streams 200 provided by a media outlet 106. An "object extractor" 202 on server 104 identifies repeating media objects and their endpoints as they occur within a media stream 200, and can store the media objects along with repeat records and other information about such media objects in dynamic media object database 204. In general, the object extractor 202 identifies repeating media objects by examining the stream 200 to determine whether previously encountered objects have occurred. For example, in the case of audio data from a media stream 200, the object extractor 202 identifies news clips or songs as being objects that have appeared in the stream before. Similarly, in the case of video data derived from a television stream, the object extractor 202 can identify specific advertisements, as well as station "jingles" and other frequently repeated objects. In the case of a television news station (i.e., a media outlet 106), for example, news clips that have repeating portions but whose lengths vary, can be identified as repeating instances of a media object. Further, such objects often convey important synchronization information about the media stream. For example the theme music of a news station typically conveys time and the fact that the news report is about to begin or has just ended.

Given an audio stream that contains objects that repeat and objects that do not repeat, the object extractor 202 automatically identifies and segments repeating media objects in the media stream 200, while identifying object endpoints by comparing matching portions of the media stream or matching repeating objects. Using broadcast audio (i.e., radio or Internet broadcast) as an example, media objects that repeat may include, for example, songs on a radio music station, news clips on a radio news station, call signals, jingles, and advertisements.

Examples of media objects that do not repeat may include, for example, live chat from disk jockeys, live commentary from a commentator between news stories on a news station, traffic bulletins, and programs or songs that are played only once. These different types of objects have different characteristics that allow for identification and segmentation from a media stream 200. For example, radio advertisements on a radio station are generally about 30 seconds in length, and consist of a jingle accompanied by voice. Station jingles are generally 2 to 10 seconds in length and are mostly music and voice, and they repeat very often throughout the day. Songs on a "popular" music station, as opposed to classical, jazz or alternative, for example, are generally 2 to 7 minutes in length, and they most often contain voice as well as music.

In general, the object extractor 202 automatically identifies and segments repeating media objects in a media stream 200 by comparing different sections of the stream with one another to locate regions or portions within the media stream where media content is being repeated. More specifically, identification and segmentation of repeating media objects is achieved by directly comparing different sections of the media stream with one another to identify matching sections of the stream, and then aligning the matching sections to identify media object endpoints. Media object segments might also be tested initially to estimate whether there is a probability that an object of the type being sought is present in the segment. If so, comparison with other segments of the media stream proceeds. If not, however, further processing of the segment in question can be neglected in the interests of improving efficiency.

The object extractor 202 can also achieve automatic identification and segmentation of repeating media objects by employing a suite of object dependent algorithms to target different aspects of audio and/or video media for identifying possible media objects. When a possible media object is identified within a media stream 200, confirmation of an object as a repeating object is achieved by an automatic search for potentially matching objects in an automatically instantiated dynamic media object database 204, followed by a detailed comparison between the possible object and one or more of the potentially matching objects. Object endpoints are then automatically determined by automatic alignment and comparison to other repeating copies of that media object.

Another procedure the object extractor 202 can employ for identifying repeating objects within a media stream 200 is to simply compute audio and/or video fingerprints from segments of the media stream 200, then to search a fingerprint database 204 to determine whether the current segment is known (i.e., whether it is a "match"), as described above. Where the fingerprint database 204 is initially empty, fingerprints are simply computed and used to populate the database. Eventually, when repeating objects appear in the media stream, they will be identified as repeating objects. Such fingerprint computation and comparison and techniques are well known to those skilled in the art, and will not be described in detail herein. However, it should be noted that while such techniques are useful for indicating that a known object is repeating within the stream, such techniques are not typically useful for identifying actual object endpoints. Therefore, the media stream, or alternately a low dimension version of the media stream, can be archived, while the associated fingerprints are stored to a fingerprint database. The archived stream is then used for identification of object endpoints.

Regardless of how a match is identified (e.g., via the aforementioned direct comparison of portions of the media stream, or via the aforementioned fingerprint comparison technique), the object extractor 202 thereafter achieves identification and segmentation of repeating media objects by aligning the matching portions of the media stream to locate object endpoints. Note that this alignment for endpoint identification, as described below, works well using either the original media stream, or using a low-dimension version of the media stream.

Approximate endpoints are located by first aligning matching portions of a media stream 200 using any of a number of conventional techniques, such as simple pattern matching, aligning cross-correlation peaks between the matching portions, or any other conventional technique for aligning matching signals. Once aligned, the endpoints are identified by tracing backwards and forwards in the media stream, past the boundaries of the matching portions, to locate those points where the two portions of the media stream diverge. Because repeating media objects are not typically played in exactly the same order every time they are broadcast, this technique for locating endpoints in the media stream has been observed to satisfactorily locate the start and endpoints of media objects in the media stream. Occasionally, however, repeating media objects will occur in the same order. For example, object A is followed by object B. In this case, an algorithm might determine that the combination AB is in fact a single object. If, however, objects A and B have occurred at least once in isolation, this situation can be disambiguated and A can be separated from B.

Alternately, as noted above, a suite of algorithms can be used to target different aspects of audio and/or video media for computing parametric information useful for identifying objects in a media stream 200. This parametric information includes parameters that are useful for identifying particular objects, and thus, the type of parametric information computed is dependent upon the class of object being sought. Note that any of a number of well-known conventional frequency, time, image, or energy-based techniques for comparing the similarity of media objects can be used to identify potential object matches, depending upon the type of media stream 200 being analyzed. For example, with respect to music or songs in an audio stream, these algorithms include, for example, calculating easily computed parameters in the media stream such as beats per minute in a short window, stereo information, energy ratio per channel over short intervals, and frequency content of particular frequency bands; comparing larger segments of media for substantial similarities in their spectrum; storing samples of possible candidate objects; and learning to identify any repeated objects.

Once the object extractor 202 acquires a media stream 200, it examines the stored media stream to determine a probability that a media object of a sought class (e.g., song, news clip, jingle, video, advertisement, etc.), is present at a portion of the stream being examined. Once the probability that a sought object exists reaches a predetermined threshold, the position of that probable object within the stream is automatically noted within a database. Note that this detection or similarity threshold can be increased or decreased as desired in order to adjust the sensitivity of object detection within the stream.

After a probable media object has been identified in a media stream 200, parametric information for characterizing the probable object is computed and used in a database query or search to identify potential object matches with previously identified probable objects. The purpose of the database query is to determine whether two portions of a stream are approximately the same. In other words, the query determines whether the objects located at two different time positions within the stream are approximately the same. Further, because the database is initially empty, the likelihood of identifying potential matches naturally increases over time as more potential objects are identified and added to the database.

When the potential matches to the probable media object have been returned, a more detailed comparison between the probable object and one or more of the potential matches is performed in order to more positively identify the probable object. If the probable object is found to be a repeat instance of one of the potential matches, it is identified as a repeat instance of the media object, and its position within the stream is saved to a database 204. Conversely, if the detailed comparison shows that the probable object is not a repeat instance of one of the potential matches, it is identified as a new media object in the database 204, and its position within the stream and parametric information is saved to the database as noted above.

The endpoints of the various instances of a repeating media object are automatically determined. For example if there are N instances of a particular media object, not all of them may be of precisely the same length. Consequently, a determination of the endpoints involves aligning the various instances relative to one instance and then tracing backwards and forwards in each of the aligned media objects to determine the furthest extent at which each of the instances is still approximately equal to the other instances.

It should be noted that the methods for determining the probability that a media object of a sought class is present at a portion of a media stream 200 being examined, and for testing whether two portions of the stream are approximately the same, both depend on the type of object being sought (e.g., music, speech, advertisements, jingles, station identifications, videos, etc.) while the database and the determination of endpoint locations within the stream are very similar regardless of what kind of object is being sought.

In general, the speed of media object identification in a media stream 200 is increased by restricting searches of previously identified portions of the media stream 200, or by first querying a database of previously identified media objects prior to searching the media stream 200.

Although the automatic identification and segmentation of repeating media objects in a media stream 200 by an object extractor 202 has generally been described above, the related application, "A System And Method For Providing User Control Over Repeating Objects Embedded In A Stream", which is incorporated by reference, includes a more detailed discussion of identifying and extracting or segmenting repeating media objects from a media stream.

Inferring and Accessing Information about Media Stream Objects

In addition to automatically identifying and segmenting repeating media objects in a media stream 200, object extractor 202 of FIG. 2 additionally stores media objects and repeat instances of media objects in database 204, along with extra identification information. It is noted that media objects having identical repeat instances within a media stream may be stored only once within database 204, in the interest of efficiency, along with additional information identifying the time and location of the repeat instances of the media object within the media stream. Extra identification information stored with media objects and repeat instances of media objects in database 204 include time stamps indicating the date and time the object occurred in a media stream, proximity information indicating the location of a media object in a media stream relative to other media objects, fingerprint information identifying the media object, and media outlet station information (e.g., a station code) identifying the media stream from which the media object has been extracted.

It is apparent, therefore, that a server 104 or servers 104 and object extractor 202 are enabled to monitor various media streams 200 simultaneously and to automatically identify and segment repeating media objects from various media streams 200. As an example, object extractor 202 of server 104 may monitor several major news media outlet 106 media streams 200 simultaneously, and store media objects, repeat instances of media objects, and various additional related identification information in database 204. As discussed further herein below, such an arrangement facilitates the cross-referencing of repeating media objects across various media streams 200 and the inference of useful information possible by such cross-referencing.

As noted, the database 204 of server 104 includes media objects and repeat instances of media objects from one or more media streams 200. Repeat instances of a media object stored within database 204 can be identical to the first instance of the object that appeared in a media stream 200, or they can be shorter or longer versions of the first instance of the object that appeared in the media stream 200. For example, a radio news station (e.g., CNN) might broadcast a short clip of a breaking news story that includes preliminary information about the story but that lacks details of the story that have yet to be discovered. Thus, a media stream 200 might include an initial media object which is fairly short representing the first instance of this news story. As the news story develops, however, subsequent news clips of the emerging story may get longer and more detailed while still retaining some portion of the initial news clip. Thus, the media stream may include subsequent media objects for the emerging news story that are longer, repeated versions of the initial media object. As interest in the news story diminishes, the media stream might include shorter media objects representing smaller versions of the initial media object. In essence, the life cycle or popularity and importance of a news story generally controls the repetition and length of related media objects in a news station's media stream. The popularity and importance of an object can therefore be inferred by estimating the frequency or repetition and the length of the object.

Furthermore, this concept might generally apply to other media types in a similar manner. For example, a radio music station playing the top 40 pop songs might play a particular song that is lower down on the top 40 list on a less frequent basis. However, as the song climbs the top 40 list, the radio station will typically play such a song on a more frequent basis. Thus, the repeat pattern of the media object representing the song within the radio station's media stream will reflect the general life cycle or popularity of the particular song.

The inference module 206 is generally configured to infer information from repeat instances of media objects in the database 204 in response to user requests for information received from a client media device 102. The inference module 206 determines information regarding media objects based on the repeat instances of media objects and the extra identification information for media objects (e.g., media object time stamps, proximity information, fingerprint information, and media outlet station information) stored in database 204. After determining the appropriate information requested from a client media device 102, the inference module 206 returns the information to the client media device 102. The types of information inferred by inference module 206 and returned to a client media device 102 generally include additional media objects related to a media object identified within a request. Such information is discussed below in more detail with respect to the user interface module 210 illustrated on client media device 102.

Client media device 102 generally includes a media application 208 suitable for rendering media streams 200 from media outlets 106. Although not illustrated, client media device 102 typically includes one or more of a sound and/or video card capable of receiving signals carrying media streams 200 from a media outlet 106. Such sound/video cards generally process incoming media streams 200 and convert them to a form suitable for rendering by media application 208. Media application 208 is illustrated in FIG. 2 as including a user interface module 210 and an object identifier 212. Although the interface module 210 and an object identifier 212 are shown as part of a media application 208, they might also be stand alone software components.

The user interface module 210 supports a user interface associated with client media device 102. The user interface module 210 and supported user interface provide user interaction and control over a media stream 200 with respect to repeating media objects that have been identified (i.e., on a server 104) within the media stream 200 as discussed above. In general, therefore, user interface module 210 enables a user to request additional information from a server 104 regarding media objects within media streams 200 being rendered by media application 208 on client media device 102. Requests entered through the user interface module 210 are directed over network 108 to a server 104.

Figure 3:
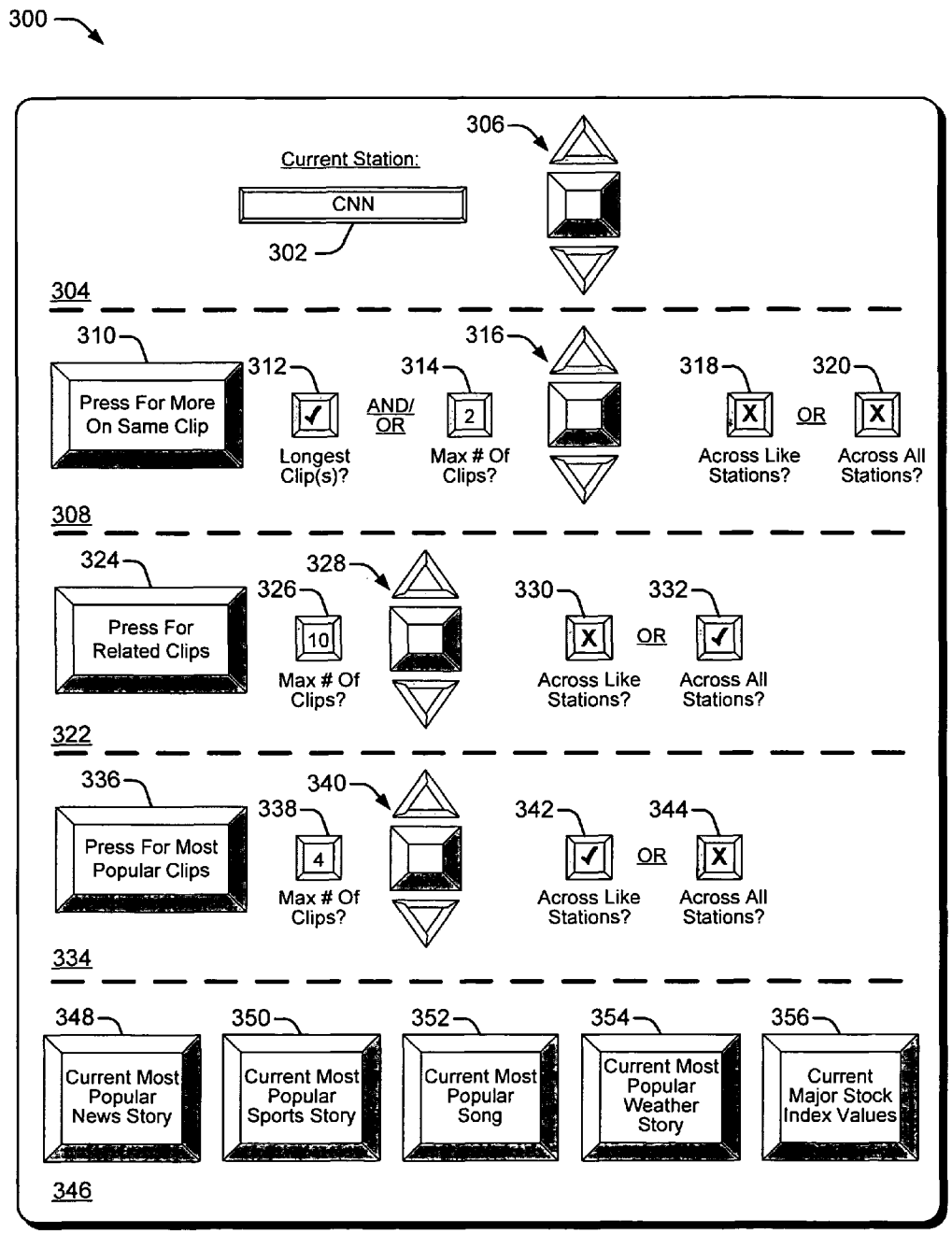
FIG. 3 illustrates an example of an interactive user interface that might be supported by a user interface module.

FIG. 3 illustrates an example of an interactive user interface 300 that might be supported by user interface module 210. The interactive user interface 300 is intended to represent a user interface that is displayed on the display screen of a client media device 102 and whose input mechanism is implemented by clicking or pressing (e.g., with a mouse) various buttons shown on the interface. It is noted, however, that the user interface 300 of FIG. 3 is merely intended to represent one example of virtually an infinite number of possible implementations that might be suitable for a user interface supported by user interface module 210. Thus, the user interface 300 shown in FIG. 3 is not intended to limit the user interface module 210 in its support of any aspect of any user interface with respect to, for example, the hardware used in implementing input/output through a user interface, the display mechanism for displaying a user interface, the design, the look, the feel, the function, and so on, of a user interface.

A brief description of the example user interface 300 of FIG. 3 will serve to illustrate several types of information that might be inferred by the inference module 206 on server 104 and made available to a user through the interactive user interface module 210. Thus, by virtue of the identification and segmentation of repeat instances of media objects from one or more media streams 200 on server 104, as discussed above, a user can request additional information via interactive user interface 300 regarding media objects being rendered by media application 208 on client media device 102.

The example user interface 300 includes a media outlet station indicator 302 in a first row 304 of controls. The station indicator 302 indicates the current station (e.g., television or radio) being received and rendered on a client media device 102. The first row 304 also includes a set of station selection control buttons 306 that enable a user to scroll up and down through available media outlet stations and select a desired station. Pressing the control buttons 306 causes the available stations to scroll up and down within the station indicator box 302. Once a user has selected a media outlet station (i.e., the station that appears in the station indicator box 302), a media stream 200 from that station is rendered on the client media device 102 via media application 208.

Prior to or during the rendering of a media stream 200 from a media outlet station (e.g., as indicated in station indicator box 302), a user can initiate various requests for desired media. For example, in a second row of controls 308, a "more of the same" button 310 allows a user to request more media clips (i.e., media objects) that include some portion of the media clip currently being rendered. The user can select the longest clip available that includes some portion of the current media clip by toggling a "longest clip(s)" button 312. The user can also request a maximum number of the longest available clips by scrolling through numbers displayed in the "max # of clips" box 314 using the number control buttons 316. The current selections illustrated in the second row 308 of controls in FIG. 3 indicate that a user desires 2 media clips that are the longest 2 clips available which contain some portion of the media clip currently being rendered.

As a more specific example, a user might be listening to a short news clip from a CNN radio news broadcast of the president's state-of-the-union speech. The current selections illustrated in the second row controls 308 of FIG. 3 will generate a request for 2 additional media objects that include a repeat instance of the current media object. The 2 additional media objects returned from the request will be the first and second longest clips having repeat instances of the current media object that occurred in the CNN radio broadcast media stream 200 during that day.

Once a user enters the desired information through the user interface 300 and presses the "more of the same" button 310, the user interface module 210 sends the request for information to the server 104. However, prior to sending the request, the user interface module 210 identifies the current media object. This can be achieved in various ways. For example, the user interface module 210 can simply send a time stamp and a station code identifying the current media station outlet 106. This permits the inference module 206 on the server 104 to determine the identity of the currently playing media object. Another way for the user interface module 210 to identify the current media object is to invoke the object identifier 212 to determine a fingerprint or signature for the current media object. Object identifier 212 operates in a manner similar to that described above for the object extractor 202 with respect to fingerprinting. That is, object identifier 212 computes audio and/or video fingerprints from a segment of the current media object and returns the fingerprint of the media object to the user interface module 210. Since the object identifier 212 can extract a fingerprint from anywhere in the current media object, the database 204 must contain fingerprints extracted from the entire duration of the media object, and the fingerprint extracted from the object identifier 212 must be compared with each to ascertain a match.

Upon receiving the request from client media device 102, the inference module 206 on server 104 queries the database 204 to determine the longest 2 additional media objects that include a repeat instance of the current media object. Thus, the inference module 206 infers from the previously identified repeat instances (now stored in database 204) of the current media object, which repeat instances are the 2 longest media objects having repeat instances of the current media object. The inference module 206 then returns the 2 longest media objects back to the client media device 102 where they are made available to the user.

The second row of controls 308 also includes toggle inputs 318 and 320. Toggle input 318 permits the user make the request "across like stations". Thus, the request for additional media objects that include some portion of the media object currently being rendered, will include a command to search "across like stations". The request initiates a query from the inference module 206 to the database 204 on server 104 that extends the search for additional media objects beyond just the currently indicated CNN news station. The inference module 206 will extend the search to all media outlet stations that are "like" the currently indicated CNN news station. For example, the inference module 206 would search repeating instances of the current media object that occurred in media streams 200 from similar stations such as FOX news stations, NBC news stations, and the like. Whichever stations the server 104 monitors are subject to the search. Note, however, that in this case toggle input 318 is not currently selected (i.e., it is marked with an "X", rather than a check mark "✓"). Therefore, the search will be limited to the media stream 200 from the currently indicated CNN news station.

Toggle input 320 is similar to toggle input 318, except that it initiates a search by the inference module 206 that extends across all of the media outlet stations that are monitored by server 104. Thus, the request will include a command to search "across all stations" being monitored. Again, however, in this case the toggle input 320 is not currently selected (i.e., it is marked with an "X", rather than a check mark "✓"), so the search will be limited to the media stream 200 from the currently indicated CNN news station.

A third row of controls 322 in the example user interface 300 of FIG. 3 provides a user with the ability to access related media objects from one or more media streams 200. The related media objects that would be returned by initiating the "related clips" request button 324 include those repeat instances of media objects that generally occur next to a current media object, or media objects whose associated metadata (e.g., key words extracted from closed captioning) matches the current media object. Thus, if a user desires media objects that are related to a currently playing media object, the third row of controls 322 provides various ways to initiate that request. In a manner similar to that described above for the second row of controls 308, a "max # of clips" 326 can be set for "related clips" 324 using a set of number control buttons 328. In another exemplary implementation, not illustrated by the example user interface 300, a user can initiate a search of media objects that are related to a currently playing media object, or any media object, by typing in a key word or words of interest. For example, a user could type in the words, "President's speech last Saturday". The inference module 206 on the server 104 would parse the words and identify simple date/time requests and access a corresponding portion of the database 204 for media objects related to the media object which is the subject of the search words.

An information request for related media objects initiated by the "related clips" button 324 initiates a query from the inference module 206 to the database 204 on server 104 that looks at all the repeat instances of the current media object playing on client media device 102, and determines what other media objects repeatedly appear in close temporal proximity to the current media object. The inference module 206 infers that such media objects are related to the current media object, and it returns a number of these clips to client media device 102, limited by the "max # of clips" 326 set in the third row of controls 322 (i.e., 10; as indicated in FIG. 3).

As a more specific example, a user might be listening to a news clip from a CNN radio news broadcast of the president's weekly radio address to the nation. Such addresses typically repeat throughout the day in which they're delivered. In response to the president's weekly radio address, a member of the opposing party typically delivers a reply speech. Such replies typically play directly after or in close temporal proximity to the initial address by the president. Thus, if a user requests related media objects during the president's weekly radio address, the inference module 206 on server 104 will locate, for example, the opposing party's reply speech and return it to client media device 102 in response to the request.

The third row of controls 322 also includes toggle inputs 330 and 332 which function in a manner similar to the toggle inputs described above with respect to the second row of controls 308. Thus, toggle input 330 permits the user to make the request "across like stations". The request would include a command to search "across like stations", and the inference module 206 would extend the search within database 204 to stations similar to the currently indicated station. As shown in the third row of controls 322, however, toggle input 330 is not selected (i.e., it is marked with an "X", rather than a check mark "✓"), so the search will not extend to like stations. However, in this case toggle input 332 is selected (i.e., it is marked with a check mark "✓" rather than an "X"). Therefore, the request includes a command to search "across all stations", so the search for related media objects will be extended within database 204 to all of the media outlet stations 106 monitored by the server 104.

A fourth row of controls 334 in the example user interface 300 of FIG. 3 provides a user with the ability to access the most popular media objects from one or more media streams 200. The most popular media objects that would be returned by initiating the "most popular clips" request button 336 include those media objects within a media stream 200 that had the highest frequency of identified repeats. The request can be made for an indicated media outlet station 106, or it can be made across like media outlet stations or all media outlet stations. Thus, if a user desires the most popular media objects from the media stream 200 of a currently indicated media outlet station, the fourth row of controls 334 provides various ways to initiate this request. In a manner similar to that described above for the second and third row of controls 308, 322, a "max # of clips" 338 can be set for "most popular clips" 336 using a set of number control buttons 340. In another exemplary implementation, not illustrated by the example user interface 300, a user can place various restrictions on the returned objects through a user interface. For example, the user might wish to limit returned objects to those that satisfy certain constraints, such as objects that are greater or less than a certain length, objects that have first appeared within the most recent two days, objects that appear with a certain minimum frequency in a media stream or media streams, or objects that appear across a certain minimum number of media streams.

An information request for the most popular media objects initiated by the "most popular clips" button 336 initiates a query from the inference module 206 to the database 204 on server 104 that looks at all the repeat instances of the currently indicated media outlet station on client media device 102, and determines which media objects have the highest frequency of identified repeats. The inference module 206 infers that such media objects are the most popular media objects, and it returns a number of these most popular clips to client media device 102, limited by the "max # of clips" 338 set in the fourth row of controls 334 (i.e., 4, as indicated in FIG. 3).

As a more specific example, a user might have the media outlet station indicator 302 set to a popular music radio station. If the user requests the most popular media objects by initiating the "most popular clips" button 336, the inference module 206 on server 104 will locate, for example, the most frequently played song of the day on the indicated radio station.

The fourth row of controls 334 also includes toggle inputs 342 and 344 which function in a manner similar to the toggle inputs described above with respect to the second and third row of controls 308, 322. Thus, toggle input 342 permits the user make the request "across like stations", in which case, the inference module 206 extends the search within database 204 to stations similar to the currently indicated station. As shown in the fourth row of controls 334, toggle input 342 is selected (i.e., it is marked with a check mark "✓" rather than an "X"), so the search will extend to like stations. Toggle input 344 is not selected (i.e., it is marked with an "X" rather than a check mark "✓"), so the search for related media objects will not be extended with database 204 to all of the media outlet stations 106 monitored by the server 104.

A fifth row of controls 334 in the example user interface 300 of FIG. 3 can provide a user with a more direct way to access the most popular media objects from different types of media streams 200. For example, the fifth row of controls 334 includes buttons for the current most popular news story 348, the current most popular sports story 350, the current most popular song being played 352, the current most popular weather-related story 354, and the current values for the major stock indexes (e.g., the DOW Jones, the NASDAQ, the S&P 500). Note that numerous additional buttons providing access to various other information might also be available in a user interface 300, and that those illustrated in row 346 are shown by way of example only, and not by way of limitation. By activating one of the request buttons in row 346, the indicated object would be delivered without any further input from the user. Each of the request buttons 348, 350, 352, 354, 356, is configured to initiate an information request for the indicated media object. The inference module 206 receives such an information request and initiates a query to the database 204 on server 104 depending on the type of request. For example, a request for the current most popular sports story 350 may cause the inference module 206 to query known sports stations such as ESPN and FOX sports in the database 204.

Exemplary Methods

Example methods for inferring information about media objects within media streams will now be described with primary reference to the flow diagram of FIG. 4. The methods apply generally to the exemplary embodiments discussed above with respect to FIGS. 1-3. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

Figure 4:
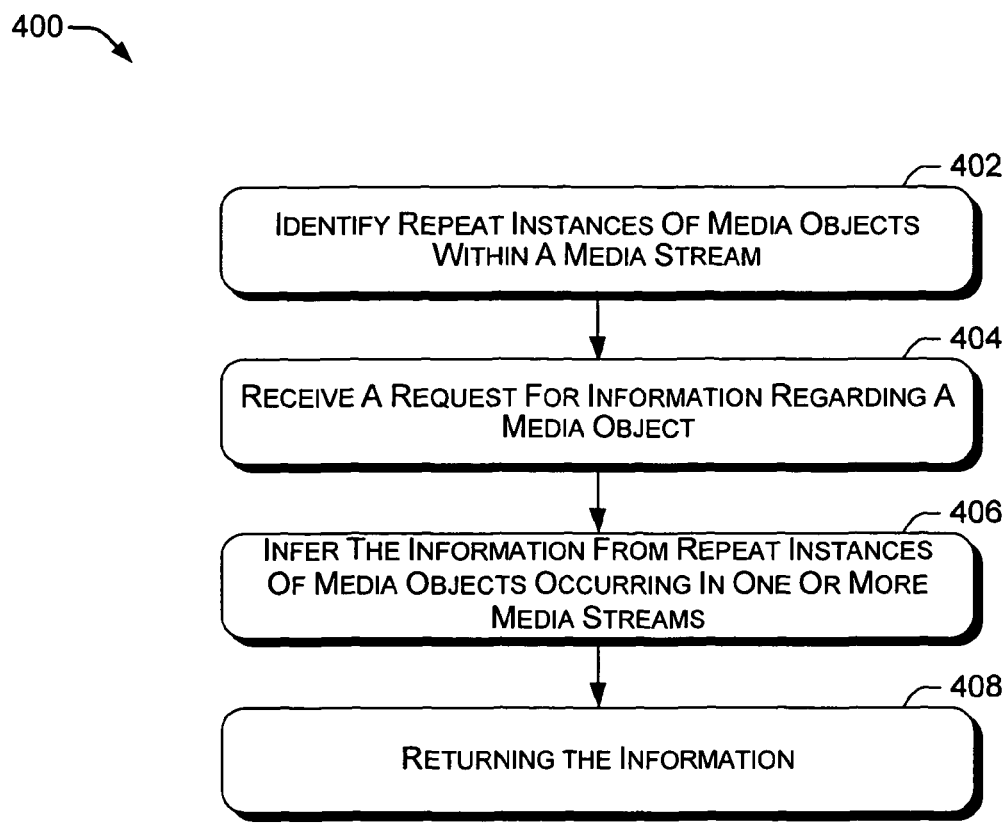
FIG. 4 illustrates a block diagram of an exemplary method for inferring information about media objects within media streams.

FIG. 4 shows an exemplary method 400 for inferring information about media objects within media streams. At block 402, repeat instances of media objects are identified within a media stream 200. The media stream can be a plurality of media streams 200, and they are provided by a media outlet station 106. The repeat instances of the media objects may be exact duplicates of one another or they may be media objects of varying lengths such a shortened versions of an original news clip. The media objects and their repeat instances are identified and segmented from media streams by a server 104 monitoring the plurality of media streams 200. The media objects and repeat instances of the media objects are stored in a database 204 on the server 104.

At block 404, a request is received for information regarding a particular media object. The request may include an identification of the media object such as a fingerprint or a time stamp and station code indicating the station providing the media stream for the media object. In addition, the request may itself identify specific media objects by the nature of the information being requested. An example would include a request for the most popular media object from an identified media stream. The media object is not specifically identified in the request, but rather, is identified by the nature of the information being requested. The server 104 receives the request from a client media device 102 executing a media application program configured to render media streams. The application supports a user interface that enables a user to make requests about media objects and media streams being rendered on the client media device 102.

At block 406, the requested information is inferred from the repeat instances of media objects occurring in the one or more media streams monitored by the server 104. An inference module on the server 104 is configured to receive the request and query the database 204 for information. The information is determined based on the repeat instances of media objects from media streams stored in the database 204. At block 408, the requested information is returned to the client media device 102 by the inference module 206.

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Exemplary Computer

Figure 5:
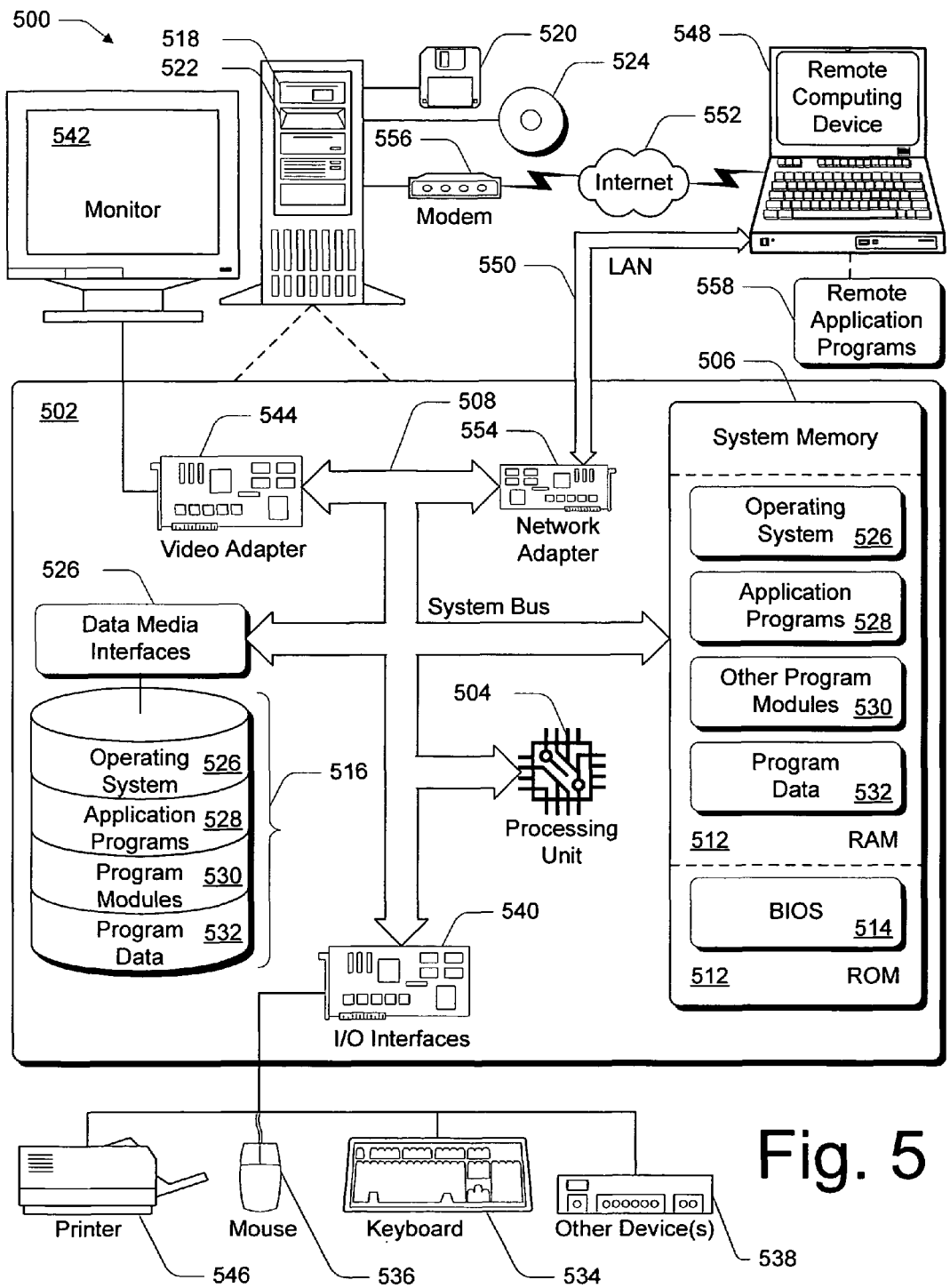
FIG. 5 illustrates an exemplary computing environment suitable for implementing a computer and server such as those illustrated in FIG. 2.

FIG. 5 illustrates an exemplary computing environment 500 suitable for implementing a client media device 102 and server 104. Although one specific configuration is shown, client media device 102 and server 104 may be implemented in other computing configurations.

The computing environment 500 includes a general-purpose computing system in the form of a computer 502. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. An example of a system bus 508 would be a Peripheral Component Interconnects (PCI) bus, also known as a Mezzanine bus.

Computer 502 typically includes a variety of computer readable media. Such media can be any available media that is accessible by computer 502 and includes both volatile and non-volatile media, removable and non-removable media. The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 can also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by a SCSI interface (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may include an embodiment of a caching scheme for user network access information.

Computer 502 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer system 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet. When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components, such as the operating system, are illustrated herein as discrete blocks, although it is recognized that such programs and components reside at various times in different storage components of the computer system 502, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A computer memory comprising processor-executable instructions configured for:
    receiving a request for information regarding a media object;
    inferring the information from repeat instances of media objects occurring within one or more media streams; and
    returning the information;
    wherein the inferring comprises comparing temporal lengths of repeat instances of the media object with one another to determine different versions of the media object, wherein the different versions of the media object are video clips, the different versions of the media object selected from the group comprising:
    a longest version of the media object;
    a number of longer versions of the media object;
    a shortest version of the media object; and
    a number of shorter versions of the media object and
    wherein the inferring further comprises determining a number of related media objects, wherein: (i) the related media objects are determined based on temporal proximities of media objects relative to the media object associated with the request, and (ii) the related media objects have a higher frequency of repeat instances relative to one another.

2. A computer memory as recited in claim 1, wherein the inferring comprises searching a database for the information, the database including media objects and records of repeat instances of the media objects.

3. A computer memory as recited in claim 1, wherein the inferring comprises:
    monitoring the one or more media streams;
    identifying the repeat instances; and
    storing records of the repeat instances in a database.

4. A computer memory as recited in claim 1, wherein the inferring comprises matching a key word from the request with metadata extracted from a media object.

5. A computer memory as recited in claim 1, wherein the inferring comprises matching date and time information from the request with date and time information of a media object stored in a database.

6. A computer memory as recited in claim 1, wherein the inferring comprises limiting returned media objects based on constraints contained within the request.

7. A computer memory as recited in claim 1, wherein the inferring comprises identifying temporal endpoints of each repeat instance of the media object.

8. A computer memory as recited in claim 7, wherein the identifying is based on an identifier included in the request, the identifier selected from the group comprising:
- a fingerprint of the media object; and
- a time stamp and channel code associated with the media object.

9. A server computer comprising the computer memory as recited in claim 1.

10. A system comprising:
- one or more processors; and
- a processor-readable storage medium, executable on the one or more processors, and comprising processor-executable instructions configured for:
  - receiving a request for information regarding a media object;
  - inferring the information from repeat instances of media objects occurring within one or more media streams; and
  - returning the information;
  - wherein the inferring comprises comparing temporal lengths of repeat instances of the media object with one another to determine different versions of the media object, the different versions of the media object selected from the group comprising:
    - a longest version of the media object;
    - a number of longer versions of the media object;
    - a shortest version of the media object; and
    - a number of shorter versions of the media object and
  - wherein the inferring further comprises determining a number of related media objects, wherein: (i) the related media objects are determined based on temporal proximities of media objects relative to the media object associated with the request, and (ii) the related media objects have a higher frequency of repeat instances relative to one another.

11. A system as recited in claim 10, wherein the inferring comprises searching a database for the information, the database including media objects and records of repeat instances of the media objects.

12. A system as recited in claim 10, wherein the inferring comprises:
- monitoring the one or more media streams;
- identifying the repeat instances; and
- storing records of the repeat instances in a database.

13. A system as recited in claim 10, wherein the inferring comprises determining a number of related media objects, the related media objects occurring within a close temporal proximity of the media object with a higher frequency of repeat instances relative to one another.

14. A system as recited in claim 10, wherein the inferring comprises matching a key word from the request with metadata extracted from a media object.

15. A system as recited in claim 10, wherein the inferring comprises matching date and time information from the request with date and time information of a media object stored in a database.

16. A system as recited in claim 10, wherein the inferring comprises limiting returned media objects based on constraints contained within the request.

* * * * *